United States Patent
Song

(10) Patent No.: US 9,489,066 B2
(45) Date of Patent: Nov. 8, 2016

(54) COMPUTER SYSTEM INCLUDING MOUSE DEVICE WITH ADJUSTABLE DPI BASED ON SCREEN SIZE AND OPERATING METHOD THEREOF

(71) Applicant: PIXART IMAGING INC., Hsin-Chu County (TW)

(72) Inventor: Willie Song, Penang (MY)

(73) Assignee: Pixart Imaging Inc., Hsin-Chu County (TW)

( * ) Notice: Subject to any disclaimer, the term of this patent is extended or adjusted under 35 U.S.C. 154(b) by 205 days.

(21) Appl. No.: 13/927,221

(22) Filed: Jun. 26, 2013

(65) Prior Publication Data

US 2015/0002397 A1    Jan. 1, 2015

(51) Int. Cl.
G06F 3/0354    (2013.01)
G06F 3/038    (2013.01)

(52) U.S. Cl.
CPC .......... G06F 3/038 (2013.01); G06F 3/03543 (2013.01)

(58) Field of Classification Search
None
See application file for complete search history.

(56) References Cited

U.S. PATENT DOCUMENTS

| | | | |
|---|---|---|---|
| 6,549,214 B1* | 4/2003 | Patel et al. | 345/660 |
| 8,502,778 B2* | 8/2013 | Lin | G09G 5/00 345/156 |
| 2009/0009808 A1 | 1/2009 | Maekawa et al. | |
| 2011/0109550 A1* | 5/2011 | Shih et al. | 345/163 |
| 2012/0274656 A1* | 11/2012 | Kang et al. | 345/619 |
| 2013/0076628 A1* | 3/2013 | Lin | 345/163 |
| 2014/0078056 A1* | 3/2014 | Yu | G06F 3/0317 345/157 |

FOREIGN PATENT DOCUMENTS

CN    201025530 Y    2/2008

OTHER PUBLICATIONS

English Abstract for CN 201025530Y.

* cited by examiner

*Primary Examiner* — Alexander Eisen
*Assistant Examiner* — Kebede Teshome
(74) *Attorney, Agent, or Firm* — Rosenberg, Klein & Lee

(57) ABSTRACT

A computer system includes a host and a mouse device. The host is configured to output a screen size signal. The mouse device adjusts a DPI value thereof according to the screen size signal from the host. The present disclosure further provides an operating method of the computer system.

21 Claims, 4 Drawing Sheets

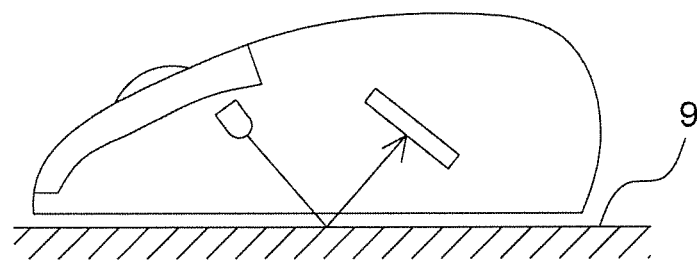
FIG. 2A
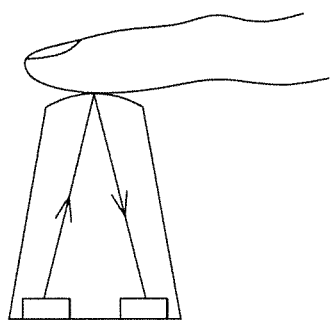
FIG. 2B
| DPI$_1$ | 1000 |
| --- | --- |
| DPI$_2$ | 1500 |
| DPI$_3$ | 2000 |
FIG. 3

COMPUTER SYSTEM INCLUDING MOUSE DEVICE WITH ADJUSTABLE DPI BASED ON SCREEN SIZE AND OPERATING METHOD THEREOF

BACKGROUND

1. Field of the Disclosure

This disclosure generally relates to a computer system and, more particularly, to a computer system including a mouse device with an adjustable dot per inch (DPI) based on a screen size and an operating method of the computer system.

2. Description of the Related Art

Traditionally, an optical mouse may output movement information with a fixed DPI (dot per inch) value to a host so that the host can control a cursor shown on a display device according to the movement information. However, when this kind of optical mouse is used to control the cursor on display devices having different resolutions, the user can be annoyed by the DPI change in operation.

For example, when the display device of a small screen size is replaced by the display device of a larger screen size, the user can feel that the moving speed of the cursor on the bigger display device becomes slower. Although in some operating systems the user can manually speed up or down the mouse DPI to a desired value, this manual adjustment is still inconvenience.

Especially nowadays, a computer system can be simultaneously coupled to a plurality of display devices having different screen sizes and for different purposes, and the above manual adjustment can become an annoying problem. One way to solve this problem is to use the display devices having an identical screen size. However, if an auxiliary display device has the same screen size as the main display device, a large space is necessary for disposing all these display devices. Especially when more than two display devices are used, a large table surface will be taken by these display devices.

Accordingly, the present disclosure further provides a computer system and an operating method thereof in which the DPI value of a mouse device may be adjusted according to a screen size of the display device that is used currently.

SUMMARY

The present disclosure provides a computer system and operating method thereof in which the DPI value of a mouse device may be automatically adjusted according to a screen size of the display device that is in operation currently.

The present disclosure further provides a computer system and operating method thereof in which the DPI value of a mouse device may be automatically adjusted when the position of a cursor is switched between different display devices.

The present disclosure provides a computer system including a plurality of display devices, a host and a mouse device. Each of the display devices has a respective screen size. The host is configured to detect the screen size of each of the display devices and outputs a screen size signal associated with the screen size of one of the display devices. The mouse device adjusts a DPI value thereof according to the screen size signal from the host.

The present disclosure further provides a computer system including a display device, a host and a mouse device. The display device has a screen size. The host is configured to output a screen size signal associated with the screen size. The mouse device adjusts a DPI value thereof according to the screen size signal.

The present disclosure further provides an operating method of a computer system including the steps of: detecting a screen size of a plurality of display devices respectively; outputting a screen size signal associated with the screen size of the display device on which a cursor is currently shown; adjusting a DPI value of a mouse device according to the screen size signal; and associating the screen size signal with the screen size of another display device when the cursor is moved from one of the display devices to the another display device.

In an aspect, a plurality of predetermined DPI values may be previously saved in the mouse device and the mouse device may select one of the predetermined DPI values closest to the screen size of the display device on which the cursor is currently shown or the display device in operation currently.

In another aspect, the mouse device may adjust the DPI value thereof to be equal to or a multiple of the screen size of the display device on which the cursor is currently shown or the display device in operation currently, wherein the multiple may be selected by a user in a particular designed mode.

In the computer system and the operating method of a computer system according to the embodiment of the present disclosure, as the host may automatically associate (e.g. information being included in transmitting packets) the screen size signal with the screen size of a different display device when the cursor is moved from one of a plurality of display devices to another display device, the user will not be annoyed by the speed change of the cursor in moving the cursor between different display devices such that a better user experience can be realized.

BRIEF DESCRIPTION OF THE DRAWINGS

Other objects, advantages, and novel features of the present disclosure will become more apparent from the following detailed description when taken in conjunction with the accompanying drawings.

FIGS. 2A and 2B show different applications of the mouse device of the computer system according to the embodiment of the present disclosure.

FIG. 3 shows a plurality of predetermined DPI values previously saved in the mouse device of the computer system according to the embodiment of the present disclosure.

DETAILED DESCRIPTION OF THE EMBODIMENT

It should be noted that, wherever possible, the same reference numbers will be used throughout the drawings to refer to the same or like parts.

Figure 1:
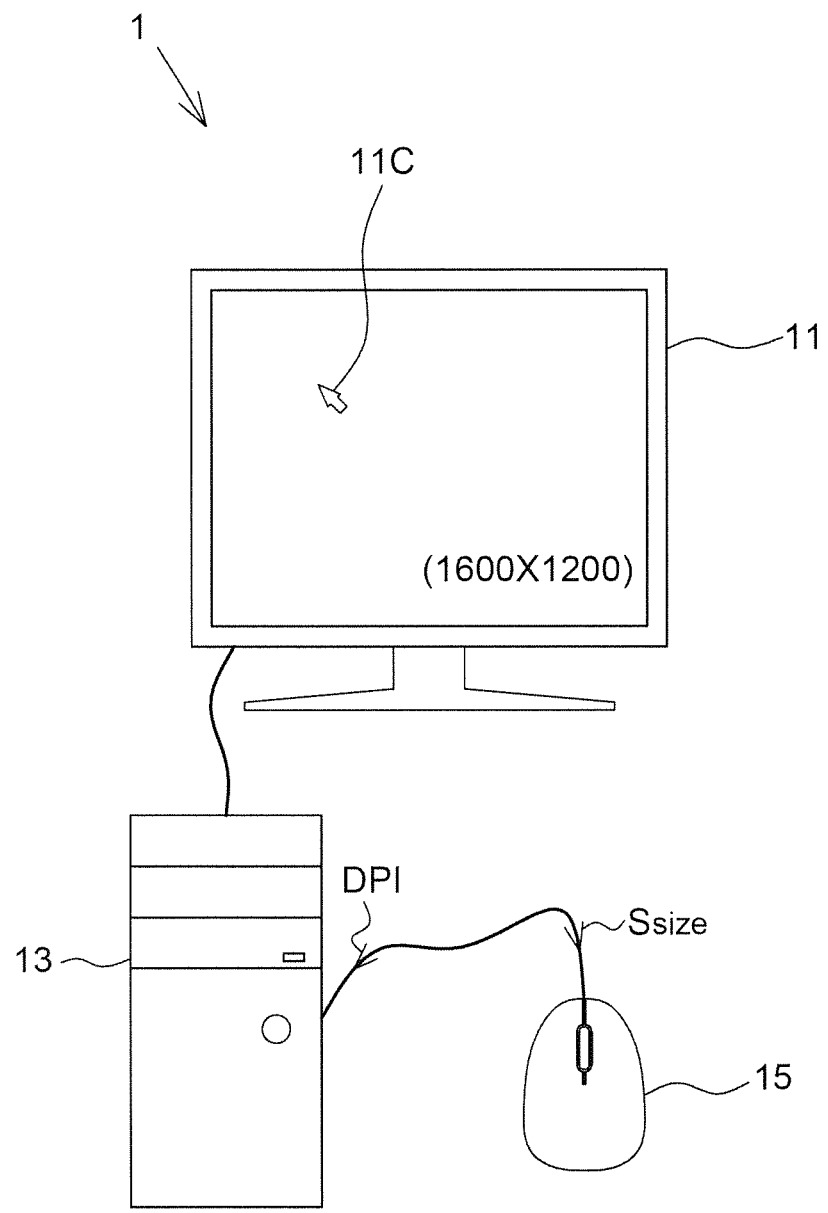
FIG. 1 shows a schematic diagram of the computer system according to an embodiment of the present disclosure.
Figure 4:
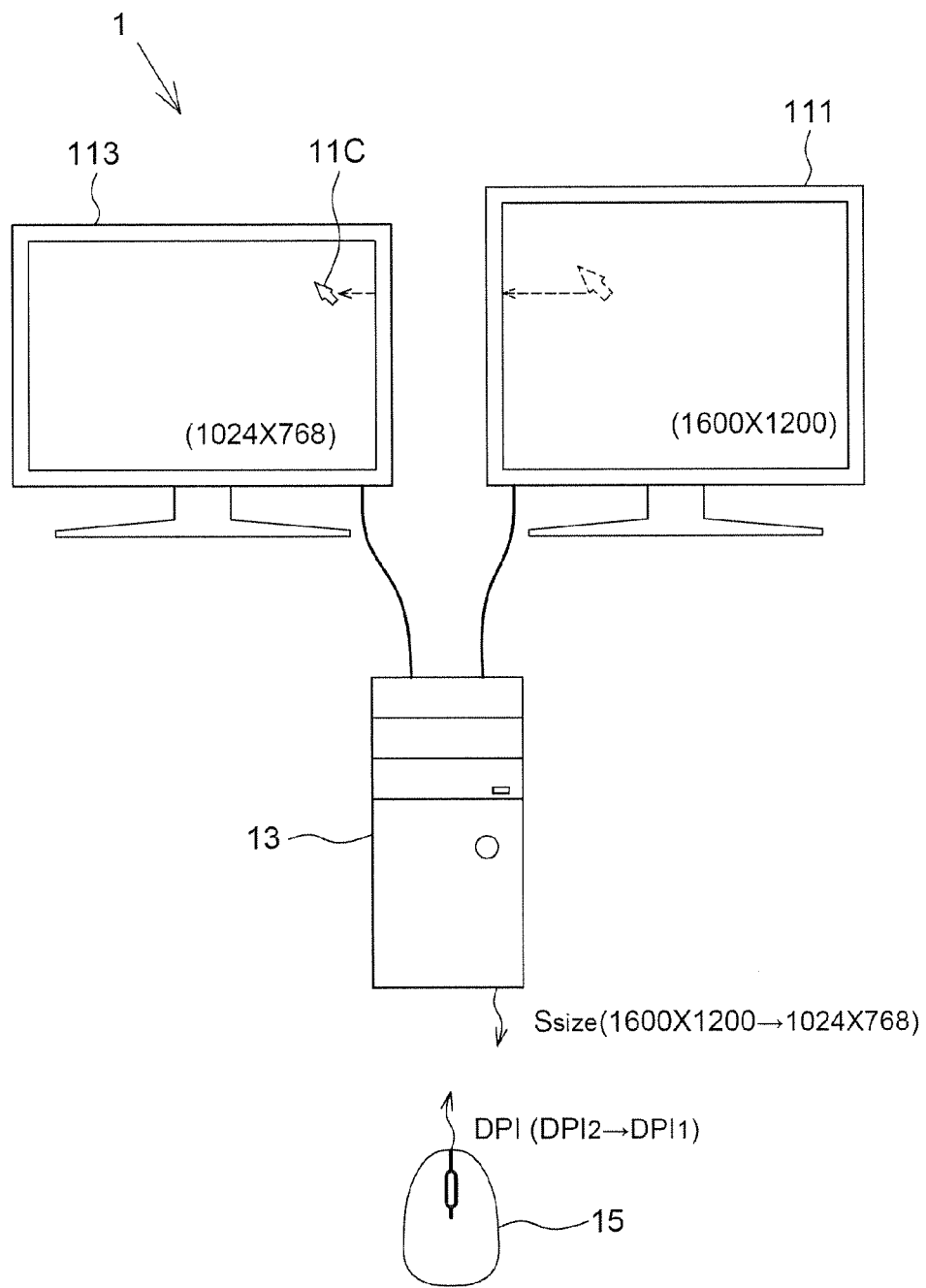
FIG. 4 shows another schematic diagram of the computer system according to an embodiment of the present disclosure, wherein the host is coupled to two display devices with different screen sizes.

Referring to FIG. 1, it shows a schematic diagram of the computer system 1 according to an embodiment of the present disclosure. The computer system 1 of the present disclosure includes at least one display device 11 (e.g. one display device 11 is shown in FIG. 1 and two display devices 111, 113 are shown in FIG. 4), a host 13 and a mouse device 15. In the present disclosure, a DPI (point per inch) value of the mouse device 15 may be automatically adjusted and determined according to a screen size (i.e. a resolution) of the display device 11 that is coupled to the host 13 currently. It should be mentioned that although FIG. 1 shows that the display device 11 is coupled to the host 13 via a cable line and the mouse device 15 is also coupled to the host 13 via a cable line, the present disclosure is not limited thereto. The connection between the display device 11 and the host 13 and between the host 13 and the mouse device 15 may be implemented by wireless communication techniques. In addition, although FIG. 1 shows that the display device 11 and the host 13 are physically separated, the present disclosure is not limited thereto. In other embodiments, the display device 11 and the host 13 may be combined as a signal device.

The display device 11 may be any device configured to show images thereon without any limitation, e.g. a television, a projection screen, a game host screen and so on. The display device 11 has a screen size, e.g. 1600×1200 shown herein. For interactive operation, the display device 11 may show a cursor 11c thereon to be controlled according to the detection of the mouse device 15. It is appreciated that the cursor 11c may not always shown on the display device 11, and it may be shown only when a specific application is executed.

The host 13 may detect the screen size of the display device 11 when a communication between the display device 11 and the host 13 is constructed, e.g. in a starting procedure or when a new display device is connected to the host 13. After the screen size of the display device 11 is detected, the host 13 then outputs a screen size signal $S_{size}$ associated with the screen size or containing information of the screen size to the mouse device 15.

The mouse device 15 may be an optical mouse operated on a work surface 9 (as shown in FIG. 2A) or an optical finger mouse (as shown in FIG. 2B). For example, if the mouse device 15 is an optical mouse, it is to detect a movement with respect to the work surface 9; whereas if the mouse device 15 is an optical finger mouse, it is to detect a movement of a fingerprint moving thereon. It should be mentioned that the method of detecting the above movement by the mouse device is well known and thus details thereof are not described herein. The present disclosure is to output the movement with an adjustable DPI value that may be adjusted and determined according to the screen size signal $S_{size}$ sent from the host 13.

For example, a plurality of predetermined DPI values (e.g. $DPI_1$, $DPI_2$ and $DPI_3$ shown in FIG. 3) may be previously saved in the mouse device 15 (e.g. saved in a memory unit of the mouse device 15) and the mouse device 15 may select one of the predetermined DPI values closest to the screen size of the display device 11 according to the screen size signal $S_{size}$. For example, as the screen size of the display device 11 is shown as 1600×1200 herein and the screen size signal $S_{size}$ contains the information of the screen size 1600×1200, the mouse device 15 may select $DPI_2$ to output the movement information to the host 13 so that the host 13 may control the motion of the cursor 11c on the display device 11 according to the movement information. It is appreciated that values and a number of DPI values shown in FIG. 3 are only exemplary but not to limit the present disclosure.

In another embodiment, the mouse device 15 may adjust the DPI value thereof to be equal to or a multiple of the screen size of the display device 111. For example, in a normal operation mode the mouse device 15 may adjust the DPI value thereof to be equal to the screen size, i.e. the dot per inch of the mouse device is equal to the screen size per inch, such that when the mouse device 15 detects one inch displacement, the cursor 11c can be moved on a screen from one end of the screen to another. In a particular speed mode, the user may select the DPI value to be a multiple, e.g. half, twice, triple and so on, of the screen size so as to control the cursor 11c in a slower or a faster speed.

Referring to FIG. 4, it shows another schematic diagram of the computer system 1 according to an embodiment of the present disclosure, wherein the host 13 is coupled to two display devices 111 and 113 having different screen sizes, e.g. 1600×1200 and 1024×768, respectively. In this embodiment, the computer system 1 includes a plurality of display devices (e.g. two display devices 111, 113 are shown herein), a host 13 and a mouse device 15. In this embodiment, the mouse device 15 is shown to be wirelessly coupled to the host 13. As mentioned above, connections between the display devices 111 and 113, the host 13, and the mouse device 15 are not limited to those shown in FIG. 4.

Each of the display devices 111 and 113 has a respective screen size, e.g. 1600×1200 and 1024×768 herein. For interactive operation, a cursor 11c may be shown on one of the display devices 111 and 113 to be controlled by the host 13 according to the detection of the mouse device 15.

The host 13 may detect the screen size of each of the display devices 111 and 113 when a communication between each of the display devices 111 and 113 and the host 13 is constructed, e.g. in a starting procedure or when a new display device is connected to the host 13. After the screen size of each of the display devices 111 and 113 is detected, the host 13 then outputs a screen size signal $S_{size}$ associated with the screen size of one of the display devices, e.g. associated with the screen size of the display device 111 or the display device 113 on which the cursor 11c is currently shown, to the mouse device 15.

The mouse device 15 is configured to adjust a DPI value thereof according to the screen size signal $S_{size}$ sent from the host 13.

As mentioned above, a plurality of predetermined DPI values (e.g. $DPI_1$, $DPI_2$ and $DPI_3$ shown in FIG. 3) may be previously saved in the mouse device 15 and the mouse device 15 may select one of the predetermined DPI values closest to the screen size of the display device on which the cursor 11c is currently shown, e.g. if the cursor 11c is currently shown on the display device 111, the mouse device 15 may select $DPI_2$ to output the movement information to the host 13 so that the host 13 may control the motion of the cursor 11c on the display device 111 accordingly; whereas if the cursor 11c is currently shown on the display device 113, the mouse device 15 may select $DPI_1$, to output the movement information to the host 13 so that the host 13 may control the motion of the cursor 11c on the display device 113 accordingly.

In another embodiment, the mouse device 15 may adjust the DPI value thereof to be equal to or a multiple of the screen size of the display device 111 or 113 on which the cursor 11c is currently shown, e.g. if the cursor 11c is currently shown on the display device 111, the mouse device 15 may adjust the DPI thereof as 1600 or as close to 1600 as possible; whereas if the cursor 11c is currently shown on the display device 113, the mouse device 15 may adjust the DPI thereof as 1024 or as close to 1024 as possible.

In this embodiment, as the cursor 11c may be changed from one display device to another, e.g. from the display device 111 to the display device 113 or vice versa. Therefore, in order to improve the user experience, the host 13 may automatically associate the screen size signal $S_{size}$ with the screen size of another display device when the cursor 11c is moved from one of the display devices to the another display device. For example, when the cursor 11c is moved from the display device 111 to the display device 113, the host 13 associates the screen size signal $S_{size}$ with 1024×768 changed from 1600×1200. And if the mouse device 15 previously saves the predetermined DPI values as shown in FIG. 3, the mouse device 15 then adjusts the DPI value from $DPI_2$ to $DPI_1$. Or the mouse device 15 may match the dot per inch of the mouse device to the screen size per inch according to the screen size of the display device on which the cursor 11c is currently shown thereon.

Figure 5:
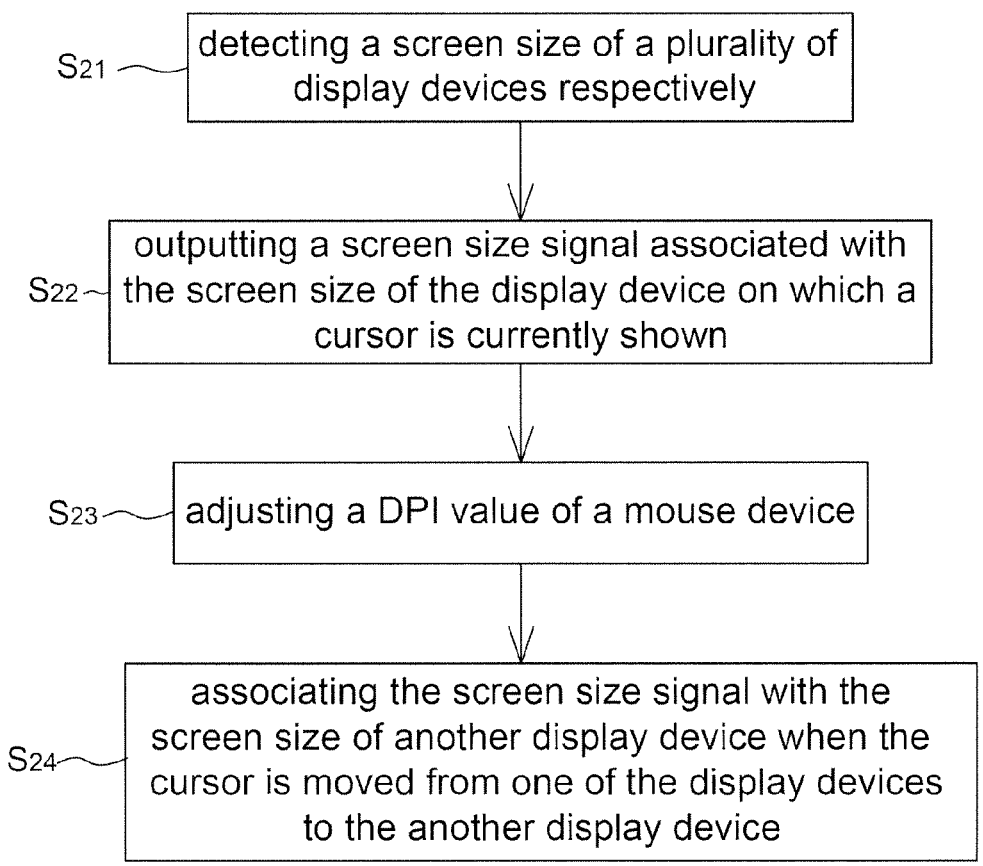
FIG. 5 shows a flow chart of the operating method of a computer system according to an embodiment of the present disclosure.

Referring to FIG. 5, it shows a flow chart of the operating method of a computer system according to an embodiment of the present disclosure, which includes the steps of: detecting a screen size of a plurality of display devices respectively (Step $S_{21}$); outputting a screen size signal associated with the screen size of the display device on which a cursor is currently shown (Step $S_{22}$); adjusting a DPI value of a mouse device according to the screen size signal (Step $S_{23}$); and associating the screen size signal with the screen size of another display device when the cursor is moved from one of the display devices to the another display device (Step $S_{24}$).

Referring to FIGS. 3-5 together, details of the operating method of this embodiment are described hereinafter.

Step $S_{21}$: When a communication between a plurality of display devices (e.g. 111 and 113 herein) and the host 13 is constructed, e.g. in a starting procedure or when a new display device is connected to the host 13, the screen size of each of the plurality of display devices 111 and 113 are detected. For example, the display device 111 has the screen size (i.e. the resolution) of 1600×1200 and the display device 113 has the screen size of 1024×768.

Step $S_{22}$: The host outputs a screen size signal $S_{size}$ associated with one of the plurality of display devices. For example, the host 13 may output the screen size signal $S_{size}$ associated with a predetermined one (e.g. a main display device) of the display devices, e.g. 111 or 113; or the host 13 may output the screen size signal $S_{size}$ associated with the display device on which a cursor 11c is currently shown. It is assumed that the cursor 11c is initially shown on the display device 111 in FIG. 4.

Step $S_{23}$: The mouse device 15 then adjusts the DPI value thereof according to the screen size signal $S_{size}$ sent from the host 13. Since the screen size signal $S_{size}$ is assumed to be associated with the screen size of the display device 111, the mouse device 15 then adjusts its DPI value corresponding to the screen size of the display device 111. In one embodiment, when a plurality of predetermined DPI values (e.g. as shown in FIG. 3) are previously saved in the mouse device 15, the mouse device 15 may select one of the plurality of predetermined DPI values closest to the screen size of the display device on which the cursor 11c is currently shown, e.g. $DPI_2$ now. In another embodiment, the mouse device 15 may adjust the DPI value to be equal to or a multiple of the screen size of the display device on which the cursor 11c is currently shown, e.g. 1600.

Step $S_{24}$: When the cursor 11c is moved from one of the display devices to another display device, e.g. from the display device 111 to the display device 113, the host 13 automatically associates the screen size signal $S_{size}$ with the screen size of said another display device, i.e. the display device 113. Then, the mouse device 15 adjusts the DPI value thereof according to the screen size signal $S_{size}$ sent from the host 13, e.g. changing from $DPI_2$ to $DPI_1$, from 1600 to 1024, from a multiple of $DPI_2$ to a multiple of $DPI_1$, or from a multiple of 1600 to a multiple of 1024. As mentioned above, the multiple may be selected by a user and it may not be an integer.

It should be mentioned that although the DPI value of the mouse device is explained by using the horizontal resolution of the display device in the above embodiments, a person skilled in the art is appreciated that the DPI value of the mouse device may also be determined according to the vertical resolution of the display device.

As mentioned above, in the conventional computer system, the mouse DPI is rather a fixed value or has to be manually adjusted so that the operation convenience can not be improved. Therefore, the present disclosure further provides a computer system and an operating method thereof (FIGS. 1, 4 and 5) in which the mouse DPI is automatically adjusted according to the screen size of a display device on which the cursor is currently moving on. The computer system and the operating method of the present disclosure especially have better user experience in the computer system including a plurality of display devices having different screen sizes.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A computer system, comprising:
   a plurality of display devices, each of the display devices having a screen size;
   a host configured to detect the screen size of each of the display devices when the plurality of display devices is connected to the host simultaneously, and output a screen size signal associated with the screen size of one of the display devices; and
   a mouse device configured to receive the screen size signal from the host and adjust a dot per inch (DPI) value of the mouse device according to the screen size signal from the host, wherein the DPI value of the mouse device is a number of dots that a cursor moves on the display devices corresponding to one inch displacement detected by the mouse device.

2. The computer system as claimed in claim 1, wherein the host is further configured to control the cursor shown on one of the display devices and output the screen size signal associated with the screen size of the display device on which the cursor is currently shown.

3. The computer system as claimed in claim 2, wherein a plurality of predetermined DPI values are previously stored in the mouse device and the mouse device is configured to select one of the predetermined DPI values closest to the screen size of the display device on which the cursor is currently shown.

4. The computer system as claimed in claim 2, wherein the mouse device is configured to adjust the DPI value thereof to be equal to or a multiple of the screen size of the display device on which the cursor is currently shown.

5. The computer system as claimed in claim 4, wherein the multiple is selected by a user.

6. The computer system as claimed in claim 2, wherein the host is configured to automatically associate the screen size signal with the screen size of another display device among the plurality of display devices when the cursor is moved from one of the display devices to the another display device.

7. The computer system as claimed in claim 1, wherein the host is configured to detect the screen size of each of the display devices when a communication between each of the display devices and the host is constructed.

8. The computer system as claimed in claim 1, wherein the mouse device is configured to detect the one inch displacement with respect to a work surface or a fingerprint.

9. A computer system, comprising:
a display device having a screen size;
a host configured to output a screen size signal associated with the screen size; and
a mouse device configured to receive the screen size signal from the host and adjust a dot per inch (DPI) value of the mouse device according to the screen size signal, wherein the DPI value of the mouse device is a number of dots that a cursor moves on the display device corresponding to one inch displacement detected by the mouse device.

10. The computer system as claimed in claim 9, wherein a plurality of predetermined DPI values are previously stored in the mouse device and the mouse device is configured to select one of the predetermined DPI values closest to the screen size of the display device.

11. The computer system as claimed in claim 9, wherein the mouse device is configured to adjust the DPI value thereof to be equal to or a multiple of the screen size of the display device.

12. The computer system as claimed in claim 11, wherein the multiple is selected by a user.

13. The computer system as claimed in claim 9, wherein the host is configured to detect the screen size of the display device in a starting procedure.

14. The computer system as claimed in claim 9, wherein the mouse device is configured to detect the one inch displacement with respect to a work surface or a fingerprint.

15. An operating method of a computer system, comprising:
detecting, by a host, a screen size of each of a plurality of display devices respectively when the plurality of display devices is connected to the host simultaneously;
outputting, by the host, a screen size signal associated with the screen size of the display device on which a cursor is currently shown; and
adjusting a dot per inch (DPI) value of a mouse device according to the screen size signal received from the host,
wherein the DPI value of the mouse device is a number of dots that the cursor moves on the display devices corresponding to one inch displacement detected by the mouse device.

16. The operating method as claimed in claim 15, further comprising:
associating the screen size signal with the screen size of another display device among the plurality of display devices when the cursor is moved from one of the display devices among the plurality of display devices to the another display device.

17. The operating method as claimed in claim 15, wherein the step of adjusting a DPI value of a mouse device comprises:
selecting one of a plurality of predetermined DPI values closest to the screen size of the display device on which the cursor is currently shown.

18. The operating method as claimed in claim 15, wherein the step of adjusting a DPI value of a mouse device comprises:
adjusting the DPI value to be equal to or a multiple of the screen size of the display device on which the cursor is currently shown.

19. The operating method as claimed in claim 18, wherein the multiple is selected by a user.

20. The operating method as claimed in claim 15, wherein the step of detecting a screen size of a plurality of display devices is performed when a communication between the plurality of display devices and the host is constructed.

21. A computer system, comprising:
a first display device having a first screen size;
a second display device having a second screen size, which is different from the first screen size;
a host configured to detect the first screen size and the second screen size when the first display device and the second display device are connected to the host simultaneously, and output a screen size signal associated with the first screen size or the second screen size; and
a mouse device configured to receive the screen size signal from the host and adjust a dot per inch (DPI) value of the mouse device according to the screen size signal from the host, wherein
the DPI value of the mouse device is a number of dots that a cursor moves on the first and second display devices corresponding to one inch displacement detected by the mouse device,
the DPI value of the mouse device is set, when the cursor is shown on the first display device, as the cursor moving a first multiple of the first screen size corresponding to the one inch displacement of the mouse device, and
the DPI value of the mouse device is set, when the cursor is shown on the second display device, as the cursor moving a second multiple of the second screen size corresponding to the one inch displacement of the mouse device, and the first multiple is identical to the second multiple.

* * * * *